United States Patent
Dernebo

(10) Patent No.: US 6,659,240 B2
(45) Date of Patent: Dec. 9, 2003

(54) ARRANGEMENT FOR A PISTON AND CYLINDER DEVICE

(76) Inventor: Lars Dernebo, Granbackavägen 90, 931 42 Skellefteå (SE)

( * ) Notice: Subject to any disclaimer, the term of this patent is extended or adjusted under 35 U.S.C. 154(b) by 24 days.

(21) Appl. No.: 10/251,592

(22) Filed: Sep. 20, 2002

(65) Prior Publication Data

US 2003/0075403 A1 Apr. 24, 2003

Related U.S. Application Data

(63) Continuation-in-part of application No. 09/806,161, filed as application No. PCT/SE00/01560 on Aug. 9, 2000, now Pat. No. 6,467,592.

(30) Foreign Application Priority Data

Aug. 10, 1999 (SE) .............................................. 9902868

(51) Int. Cl.[7] .................................................. F16F 9/00
(52) U.S. Cl. .................... 188/313; 188/277; 188/322.5; 188/322.2; 267/64.26
(58) Field of Search ............................ 267/64.13, 64.26, 267/64.28; 188/267, 267.1, 267.2, 266.1, 266.2, 266.5, 266.6, 269, 276, 277, 278, 282.3, 313, 314, 316, 315, 284, 318, 322.13, 322.19, 322.2, 289, 322.5, 299.1

(56) References Cited

U.S. PATENT DOCUMENTS

| | | | |
|---|---|---|---|
| 3,827,538 A | 8/1974 | Morgan | |
| 4,749,070 A | 6/1988 | Moser et al. | |
| 4,846,317 A * | 7/1989 | Hudgens | 188/266.5 |
| 5,386,893 A * | 2/1995 | Feigel | 188/266.5 |
| 5,396,973 A | 3/1995 | Schwemmer et al. | |
| 5,467,852 A | 11/1995 | de Kock | |
| 6,250,612 B1 * | 6/2001 | Doll | 267/64.11 |
| 6,293,530 B1 * | 9/2001 | Delorenzis et al. | 267/64.13 |
| 6,296,091 B1 * | 10/2001 | Hamilton | 188/314 |
| 6,389,341 B1 * | 5/2002 | Davis | 701/37 |
| 6,467,592 B1 * | 10/2002 | Dernebo | 188/278 |

* cited by examiner

*Primary Examiner*—Jack Lavinder
*Assistant Examiner*—Devon Kramer
(74) *Attorney, Agent, or Firm*—Rolf Fasth; Fasth Law Offices

(57) ABSTRACT

The hydraulic cylinder or shock absorber arrangement has a cylinder unit limiting an inner space in which a medium in the form of a gas or a liquid is intended to be placed. A forwardly and backwardly movable piston unit is placed such that it can slide within the space that is defined by the piston into a first chamber and a second chamber. An inlet/outlet is defined in the respective chambers of the cylinder unit for the addition to and removal of medium from the chambers together with devices that co-acts in order to determine the relative position of the piston within the cylinder unit.

13 Claims, 6 Drawing Sheets

ARRANGEMENT FOR A PISTON AND CYLINDER DEVICE

PRIOR APPLICATION

This is a continuation-in-part application of U.S. patent application Ser. No. 09/806,161; filed Mar. 26, 2001; now U.S. Pat. No. 6,467,592 which claims priority from PCT/SE00/01560, filed Aug. 9, 2000; which claims priority from Swedish Application No. 9902868-0, filed Aug. 10, 1999.

FIELD OF INVENTION

The present invention concerns an arrangement for a piston and cylinder device.

BACKGROUND AND SUMMARY OF THE INVENTION

Piston and cylinder devices as such are used in a number of applications, for example in the form of positioning and maneuvering devices such as drive cylinders in order to maneuver movements in machines. The devices may also be in the form of shock absorbers to absorb and dampen movements between elements that are joined to pivot with each other. The above-mentioned types of piston and cylinder devices, independently of whether they are designed to be used as positioning and maneuvering devices or as shock absorbers, have in common that they display an inlet/outlet to each chamber such that the medium that is used can be added to and removed from the chambers. However, for a shock absorber, the inlet/outlet to each chamber of the piston- and cylinder device are connected together and designed as a common channel or passage such that the medium can flow forwardly and backwardly between the two chambers during the forward and backward motion of the piston device in the cylinder. On the other hand, in the type of piston and cylinder device that is used as a drive cylinder or positioning device, the inlet/outlet of each chamber are separate from each other and are each individually in flow-through connection with an external circuit that contains, among other things, devices for the control of the direction of some pressurized medium such as oil or air.

In the case of shock absorbers, the above-mentioned passage between the chambers is arranged in the actual piston device whereby the damping force that thus arises is mainly derived from the friction of the medium in the channel. The damping force can be regulated by varying the flow resistance or the speed and rate of flow with which the medium is allowed to flow forwardly and backwardly through the channel.

Recently, piston and cylinder devices have been developed with integral position-sensitive elements, that is, devices that make it possible to determine the motion of the piston device relative to the cylinder unit. The position-sensitive devices are usually connected to an external control unit, for example in the form of a computer. In the case of shock absorbers, the computer can be provided with the information that is required to control and regulate the damping properties or characteristic of the shock absorber in a way that is suitable for the application. For example, the damping force or characteristic of the shock absorber can be varied depending on the properties of the road surface, the speed, the terrain, the road slopes, vehicle tilt etc., or depending on parameters that are specified in advance, that is, if the vehicle is to offer a smooth and comfortable ride and thus offer high comfort for the travelers, or to allow more advanced and demanding driving. The computer can also be supplied with information about the speed, acceleration, etc., of the vehicle, in order to calculate an optimal damping characteristic of the shock absorber for the current driving conditions, based on the information that is supplied. The integral position-sensitive elements of the shock absorbers may also be used to measure the temperature of the medium that is exchanged between the two chambers of the shock absorber. If the properties of the medium that has been chosen to function in the shock absorber are previously known and these properties are stored in a computer, the measured temperature of the medium can be used to calculate its internal friction, or viscosity, at each instant. By regulating, based on this information, the speed and the rate of flow with which the medium is allowed to flow through the flow channel that exists between the two chambers of the shock absorber, the properties of the shock absorber can also be maintained essentially constant, independent of the temperature of the surroundings or of the shock absorber itself.

Piston and cylinder devices that are currently known have fairly complicated constructions in order to allow the medium to flow into and out from the chambers, and to make it possible to control and guide the movements of the piston and cylinder device.

One object of the invention is to achieve a piston and cylinder device that not only makes it possible for the medium to flow into and out from the chambers, but also allows in this part control and guidance of the movements of the piston in the piston and cylinder device.

BRIEF DESCRIPTION OF THE DRAWINGS

This invention will be described in more detail in the following with reference to the attached drawings, in which.

DETAILED DESCRIPTION

Figure 1:
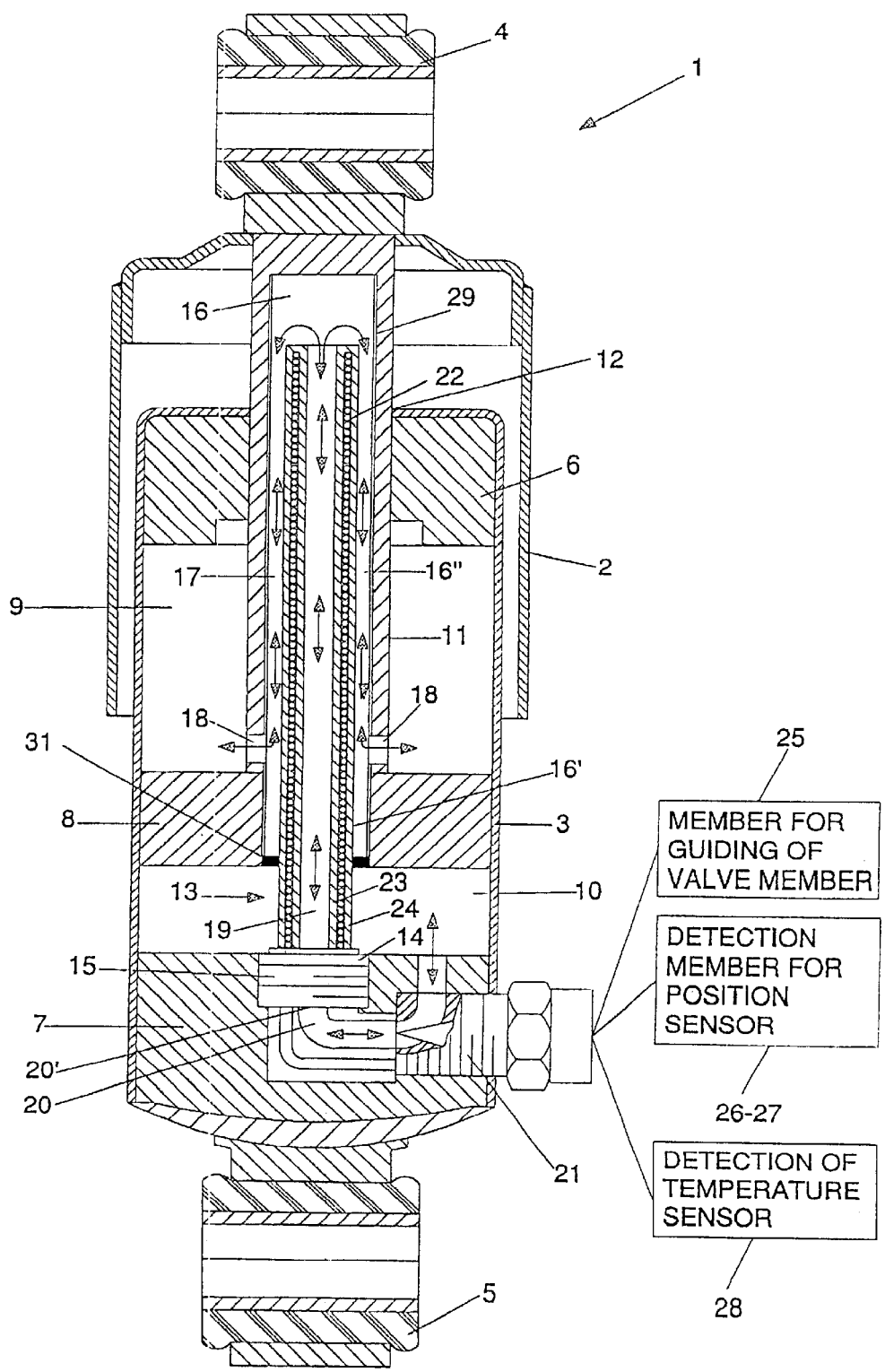
FIG. 1 shows a view in longitudinal cross-section through a shock absorber equipped with an arrangement according to the invention.

Referring to FIG. 1, the device or shock absorber 1 has a cup-shaped outer cylinder unit 2 and an inner cylinder unit 3 that are able to move relative to each other in an axial telescopic manner, and that are equipped at their free ends with fixtures 4 and 5, respectively, for mounting between two parts that move relative to each other, the vibrations of which are to be damped, for example the wheel axle in a vehicle body.

The inner cylinder 3 is equipped with end walls 6 and 7 and limits with respect to its longitudinal axis a cylindrical inner space that has a rotationally symmetric shape and in which is placed a damping medium, that is preferably in the form of a fluid or a liquid, and a forwardly and backwardly mobile piston device 8 that acts in the cylinder space and that makes contact in a manner that prevents fluid leakage with the inner surface of the cylinder unit 3 to divide the cylinder space into a first chamber 9 and a second chamber 10. The piston device 8 has a seal 31 that seals against outer wall of the tube 13.

To one end of the piston device 8 is firmly attached one end of a piston rod 11, the second end of which stretches out through a central opening 12 in one end wall 6 of the inner cylinder unit 3 and which is sealed against the opening 12 with respect to the fluid that is used. The outer cup-shaped cylinder unit 2 is open towards the inner cylinder unit 3.

The lower end wall 7, that is, the part that faces away from the protruding end of the piston rod, is arranged an extended tube-shaped element, generally denoted by 13, that lies coaxial with the central axis of the cylinder 3. The tube-shaped element 13 has been given a circular cross-section, and is equipped at one of its ends with a ring-shaped base part 14 that is fixed by means of a screw connection into a recess 15 in the end wall 7 that opens into the second chamber 10, and that has a second end that is placed into a recess 16 that lies along the central axis of the piston device 8 and the piston rod 11. FIG. 1 shows the tube-shaped element 13 positioned in a first section 16' of the recess 16 in a manner that prevents fluid leakage and that allows the sliding to be controlled, whereby a second section 16" of the recess 16 that lies after the first section, seen from the point of view of the piston rod 11, having a larger diameter than the first section such that a ring-shaped space 17 is defined between the outer surface of the tube-shaped element 13 and the inner surface of the second section 16" of piston rod 11 when the shock absorber is placed into a fully or partially compressed state. It should be realized, when FIG. 1 is studied more closely, that the ring-shaped space 17 is thus in fluid communication with the first chamber 9 of the cylinder unit 3 via openings 18 that stretch radially through the cavity wall of the piston rod 11.

The hollow inner space of the tube-shaped element 13 forms a channel 19 that runs axially, one end of which opens into the inner ring-shaped space 17 of the piston rod 11 and the second end of which can be placed in fluid communication with the second chamber 10 of the cylinder unit 3 via a channel 20 that is equipped with valve devices 21 and that is arranged in the second end wall 7. As best shown in FIG. 1, the channel 20 displays an opening 20' that may both serve as inlet and outlet, and opens into the first chamber 10. The valve device 21 can be of any known type that is suitable for the purpose, and the invention provides the advantage that it can be placed in a stationary unit of the shock absorber, that is, in a unit that does not follow the motion of the piston. In the embodiment of the present invention that is described here, the valve device 21 is placed in a recess arranged in the end wall 7 and attached to it by means of a screw connection.

When the valve device 21 is in an open position, as shown in FIG. 1, the first chamber 9 and the second chamber 10 of the cylinder unit 3 communicate with each other through the channel 19, that is formed by the hollow inner space of the element, and the channel 20 defined in the end wall 7. The flow communication between the chambers 9, 10 is shown in FIG. 1 by arrows whereby the shock absorber 1, in the example that is displayed here, moves downwardly towards the compressed condition. During the motion of the piston device 3, fluid that is passing through the tube-shaped element 13 can be removed either from the first chamber 9 to the second chamber 10, or vice versa. The devices that are used for controlling the valve device 21 are generally denoted by the functional block 25 in FIG. 1, and will be described in more detail below. By regulating the degree of the opening of the valve device 21, it follows that the flow rate of the flowing quantity of fluid can be controlled in a simple manner. During motion of the shock absorber, fluid is continually exchanged between the chambers 9, 10 and thus the damping properties or characteristic of the shock absorber 1 can also be varied.

According to the principles of the present invention, the tube-shaped element 13 forms part of a position-sensitive element or sensor device, from which information can be obtained in the form of electrical signals about the physical quantities, which signals can be used to guide and control the function of the shock absorber. The sensor devices comprise detection- and sensor elements that make it possible, among other things, to determine the position at any instant of the piston device 8 or its speed within the cylinder unit 3, by the performance of motion relative to each other.

The position-sensitive sensor and detector elements can be of any known type, but it is preferable from the point of view of function if they are of a type in which the sensing occurs without mechanical contact. It is appropriate if the sensing elements are electrically insulated from each other and that the position-sensitive detection element is so designed that it forms a measurable reactive alternating current resistance, or an impedance component, whereby the measurable reactive electrical impedance varies according to the position of the piston element in the cylinder. Further, the position-sensitive detection and sensor elements should be so designed that the electrical signal from the position-sensitive element can be led out from a stationary unit of the shock absorber, while the sensor element follows the motion of the piston unit.

The tube-shaped element 13 has an inductor that contains an electrical conductor 22 that is wound around an inner tube-shaped empty core in order to form a coil.

In the embodiment that is described herein, the tube-shaped element 13 is formed of two tubes 23, 24 that are concentrically placed with one surrounding the other, the inner one of which is manufactured from a ferromagnetic material and the outer one of which is manufactured from a non-ferromagnetic material. In order to resist the high pressures that may exist inside the cylinder unit, it is appropriate if the inner tube is manufactured from ferromagnetic steel while the second tube may be manufactured from a paramagnetic material such as stainless steel. It is appropriate if the electrical coil 22 is electrically insulated embedded between the said tubes in a suitable resin material. The axially lying hollow space of the inner tube 23 thus forms at the same time a flow connection between the first chamber 9 and the second chamber 10 of the cylinder unit 3. The outer tube 24 has an external surface that is so designed that it can be taken up into the first section 16' of the recess 16 in the cylinder device 3 in a manner that prevents fluid leakage and that allows the sliding motion to be controlled. In order to determine the position at each instant of the piston device 8 in the cylinder unit 3, the tube-shaped element 13 that has been arranged as an inductor collaborates with a sensor element that moves with the piston device 3 and the piston rod 11, which may suitably comprise the parts themselves or may be in the form of a lining 29 of, for example, brass or aluminum, that is set into one of the parts. It is also conceivable to coat or plate the cavity wall of the recess 16 with a layer of a material that has been selected based on the design of the inductor, for example aluminum, and that influences the output signal from the inductor.

During the vibration movement of the shock absorber, the tube-shaped element 13 is more or less surrounded by the parts 29 that form the piston unit, whereby a measurable impedance component can be obtained from the inductor, in the form of an electrical signal, that varies depending on the position of the piston device 8 in the cylinder unit 3 since the portion of the element 13 that is below the piston 8 is not surrounded by the piston 8 itself and the piston rod 11.

The sensor devices described above are connected to a functional block that is denoted by the reference numerals 26 and 27, that concerns the electrical circuits that are used for driving, guiding and controlling the movement parameters of a shock absorber equipped with an arrangement according to the present invention, together with another functional block denoted by the reference FIG. 28 that contains devices for measuring the temperature of the medium that flows through the shock absorber. The medium that flows between the chambers 9, 10 of the shock absorber passes or is led via sensor devices and that the temperature of the medium at any instant can be measured, which, however, will be described in more detail below. One important feature of the present invention is that when the inductor, attached to the tube-shaped element 13, is exposed to temperature variations, the resistance of the coil 22 that is part of the inductor changes, whereby, if these changes in resistance are measured, information about the temperature of the medium that flows between the chambers 9 and 10 in the cylinder unit 3 can be obtained, and thus also information about its viscosity. The arrangement according to the present invention has the advantage that the actual or real temperature of the medium can be sensed directly in that the medium continuously passes or is led through the inductive position-sensitive tube-shaped element 13. In this way, problems associated with conventional shock absorbers, namely the problem that the damping power tends to vary with the operating temperature due to variations in the viscosity of the damping medium, can be essentially avoided.

Figure 2:
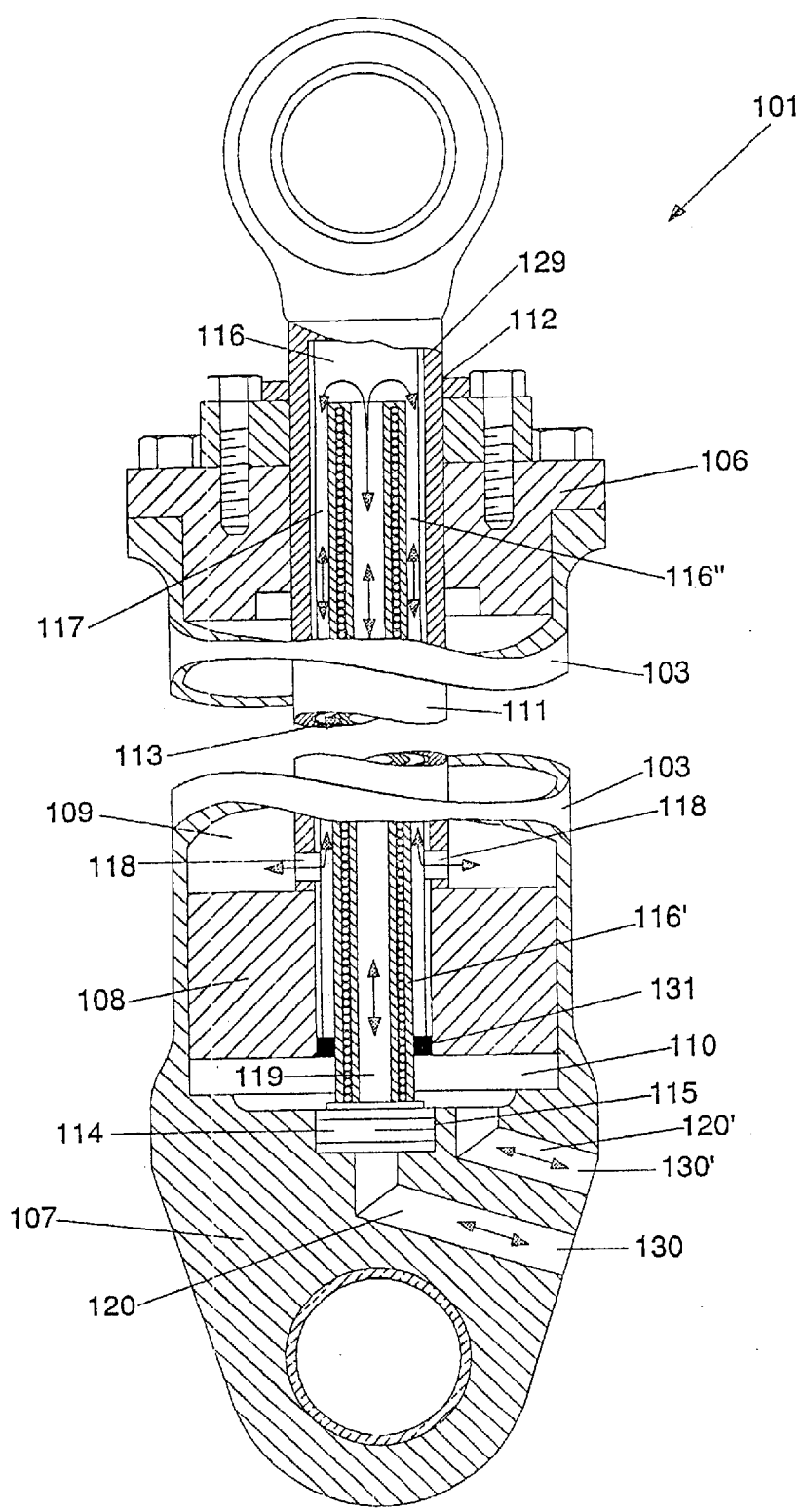
FIG. 2 shows a view in longitudinal cross-section through a drive cylinder equipped with an arrangement according to the invention.

Even if the particular embodiment of the invention that has been described here has been principally shown and described applied to a shock absorber, it should be realized that the same embodiment could be applied in an essentially equivalent manner, to, for example, a hydraulic cylinder of the type that is shown in FIG. 2.

The arrangement according to the present invention is shown in FIG. 2 applied to a hydraulic cylinder whereby the value 100 has been added to those parts described above in FIG. 1 in order to make it clear that those parts that have been described above in FIG. 1 are essentially equivalent to the parts that are comprised in the said hydraulic cylinder. As shown in FIG. 2, the hydraulic cylinder, generally denoted by the reference numeral 101, comprises a cylinder unit 103 that together with the end walls 106 and 107 limit an inner ring-shaped space in which is placed a piston unit in the form of a piston device 108, dividing the space into a first chamber 109 and a second chamber 110, together with a piston rod 111. One end of the piston rod 111 is attached to the piston device 108, while its second end protrudes from the cylinder unit 103 through an opening 112 in one end wall 106, which it penetrates in a manner that prevents fluid leakage.

Further, the piston device 108 is so designed that it can slide within the cylinder unit in a manner that prevents fluid leakage. The piston device 108 has a seal 131 that seals against the outer wall of the tube element 113. The figure shows the lower end wall 107 is arranged a tube-shaped element, generally denoted by the reference figure 113, that stretches coaxial with the central axis of the cylinder unit into a recess 116 that is arranged to run coaxial within the piston unit, in which the tube-shaped element is placed in a manner that prevents fluid leakage and allows the sliding to be controlled into a first section 116' of the depression 116. Similar to that which has been previously described, the tube-shaped element 113 is equipped at one end with a ring-shaped base part 114 that is fixed into a recess 115 in the end wall 107 by means of a screw connection.

As shown in FIG. 2, a ring-shaped space 117 is formed between the inner surface of the piston rod 111 at a second section 116" of the recess 116 and the outer surface of the tube-shaped element 113.

The hollow space of the tube-shaped element 113 forms a channel 119 that runs axially, one end of which through the openings 118, which pass radially through the wall of the piston rod 111 opens out into the said ring-shaped space 117, which in turn is placed in flow connection with the chamber 109 through which the piston rod passes. The second end of the hollow space of the tube-shaped element 113 communicates through a first channel 120 arranged in the end wall 107 with a first connection to the cylinder, defined as an inlet and outlet opening 130. The second chamber 110 of the cylinder unit communicates with a second connection 130' to the cylinder unit through a second channel 120' that is arranged in the end wall 107.

It should be realized that the piston unit that is taken up into the cylinder 101 could be maneuvered forwardly and backwardly in the cylinder if the connectors are connected to an outer circuit that comprises devices for controlling the direction of flow of a pressurized hydraulic medium. As shown by the arrows in the figure, this medium is led into one chamber 110 while at the same time being withdrawn from the second, opposite chamber 109.

Similar to that which has been described above, the tube-shaped element 113 also here forms part of a position-sensitive sensor device, the design of which is essentially equivalent to that described above.

Figure 3:
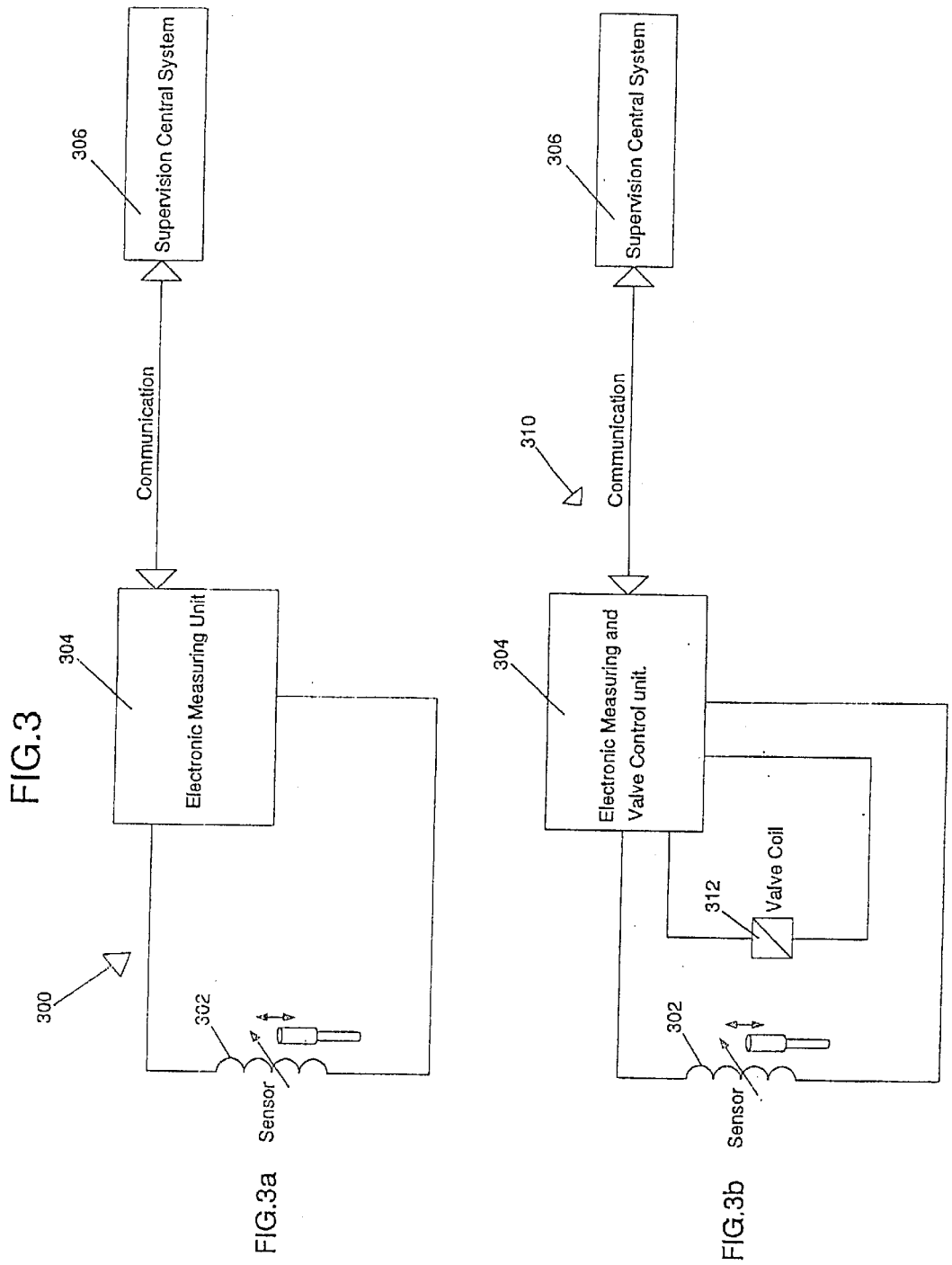
FIG. 3a is a schematic block diagram of the sensor and an electronic system.
FIG. 3b is a schematic block diagram of the sensor, a valve and an electronic system

As shown in FIG. 3, the principle of the circuit 26 that is used to drive the inductor that is attached to the tube-shaped element 13 is shown in the form of functional blocks in FIGS. 3a/3b. FIG. 3a shows a block diagram 300 that has a sensor 302, as shown in the tube 13, 113 shown in FIGS. 1–2, that may be used to sense data such as the temperature, velocity and position of the piston in the cylinder. The sensor 302 is in communication with an electronic measuring system 304 that in turn is in communication, via a bus system, A/D signals or any other suitable communication method, with a supervisory central system 306. The system 306 may override instructions provided by the system 304. The systems 304, 306 may be used to read data sensed by the sensor 302 and to guide and control functions of the cylinder unit and its valve system. FIG. 3b is a second block diagram 310 that is similar to the block diagram 300 shown in FIG. 3a. The diagram 310 also includes a valve system 312. The systems 304, 306 may control and guide the valve system 312 depending upon the data, including temperature, piston velocity and position of the cylinder piston, received from the sensor 302. The valve system 312 may include the valves 136, 144, 152 shown in FIGS. 5, 6. As indicated earlier, the system 306 may override any instruction issued by the system 304. However, it is also possible for the system to share responsibilities and it is not necessary for the system 306 to always override the system 304. The system 306 may also be a human operator that enters commands on an instrument panel.

Figure 4:
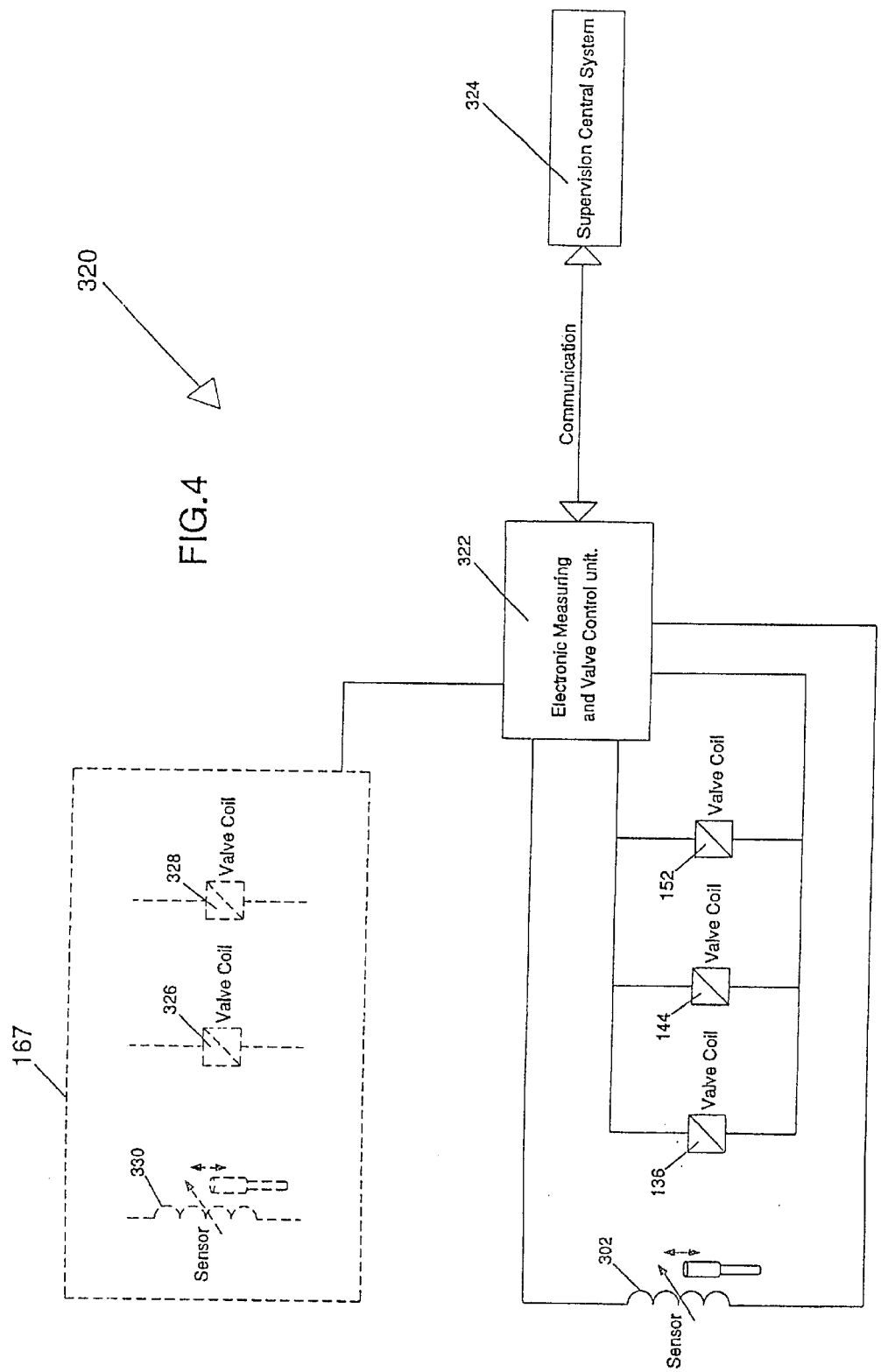
FIG. 4 is a schematic block diagram of the sensor connected to an external function and an electronic system.
Figure 5:
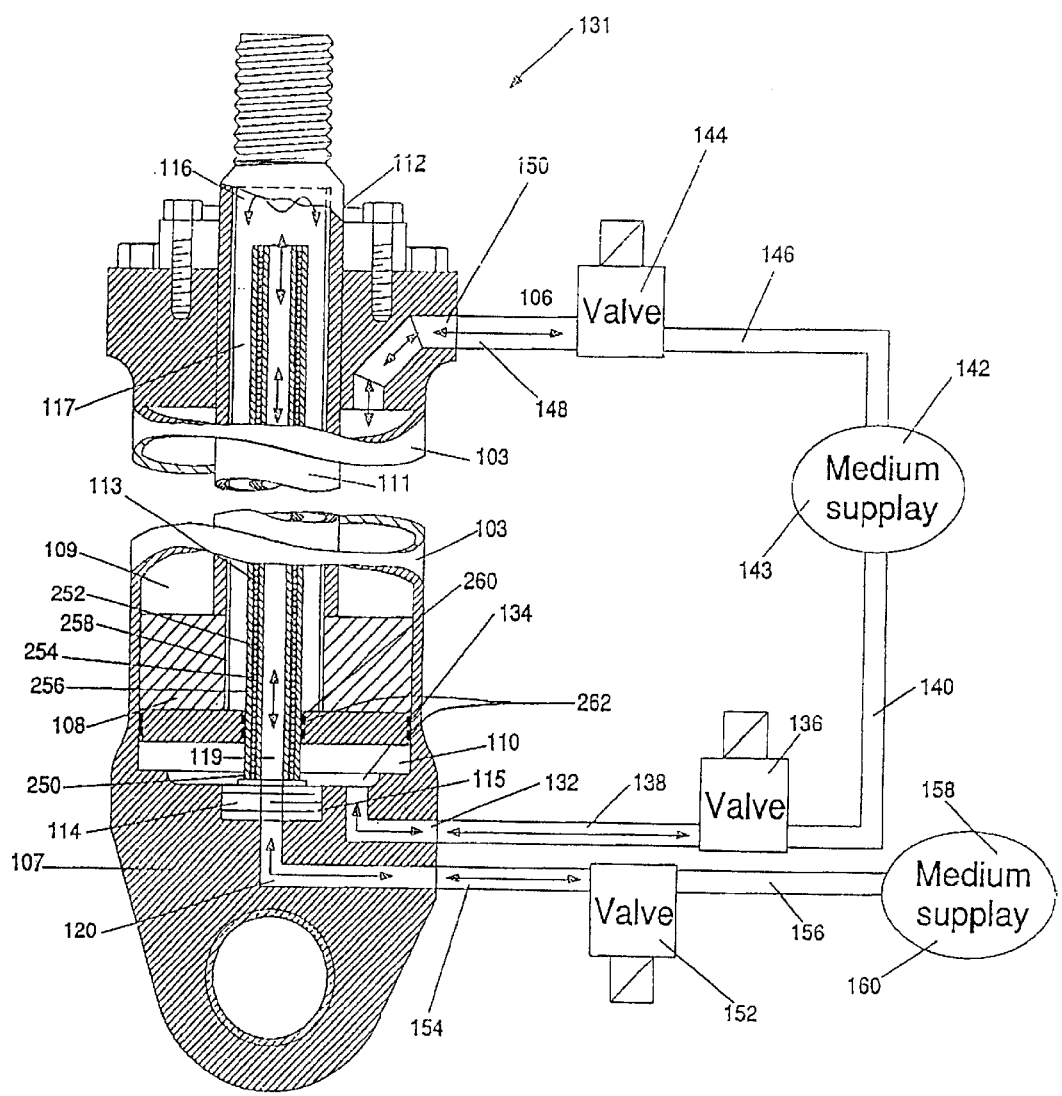
FIG. 5 is a cross-sectional view of a second embodiment of a drive cylinder of the present invention.
Figure 6:
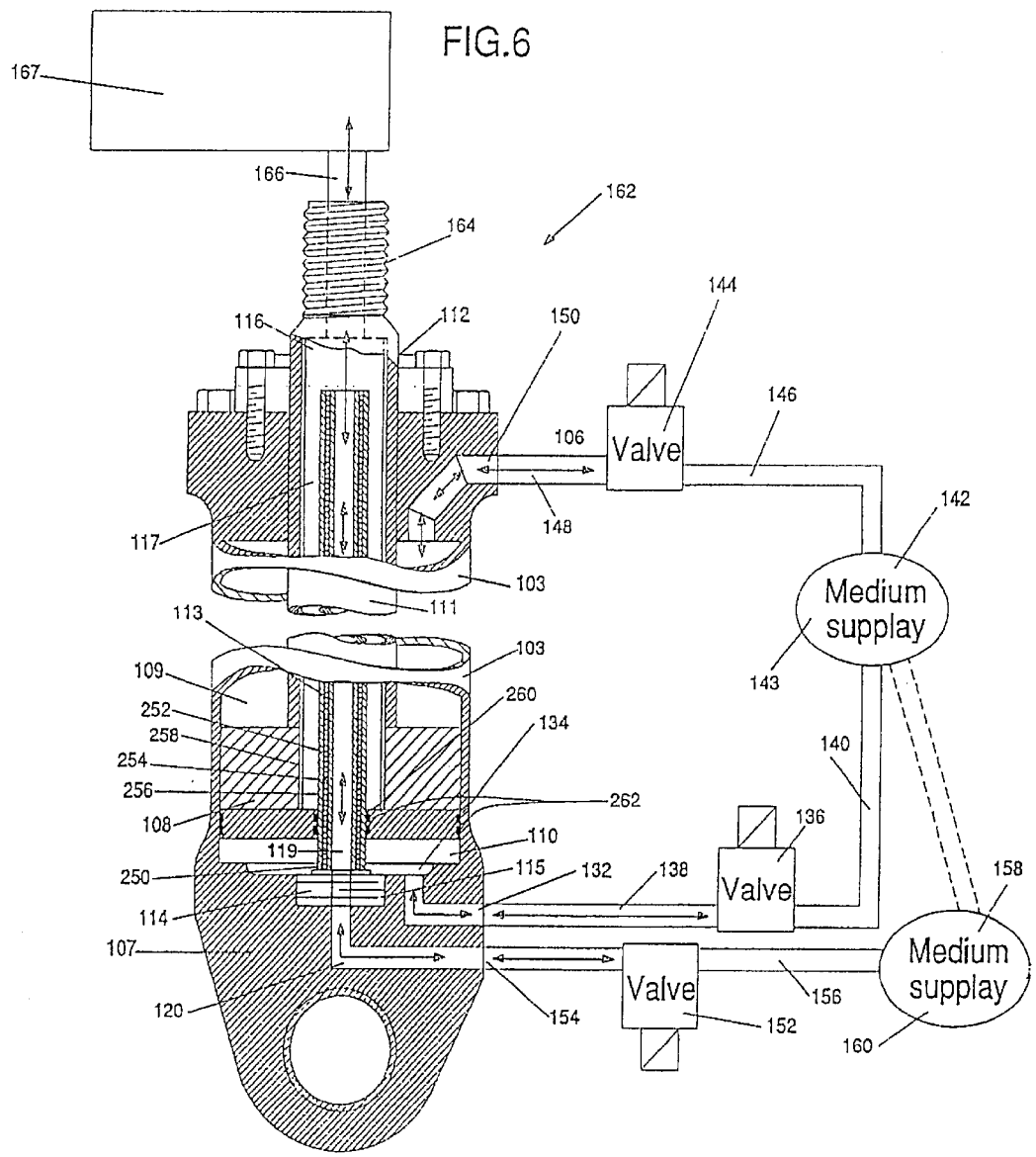
FIG. 6 is a cross-sectional view of a third embodiment of a drive cylinder of the present invention.

As shown in FIG. 4, is a schematic flow diagram 320 that shows how the guiding system for the cylinders, shown in FIGS. 5, 6, may look like. An electronic measuring system 322 may communicate with a supervisory central system 324 via a suitable communication device such as a databus or other signals. The system 322 may also receive overriding instruction signals from an operator who may send signal via activation buttons and other instruments by the supervisory central system 324. The system 322 guides the valves 136, 144, 152 and reads and interprets the information, related to temperature, piston velocity and piston position, sensed by the sensor 302. The units 322, 324 may also guide or supervise valves 326, 328 and a sensor 330 that may be part of the extra function 167, shown in FIG. 6 and described below.

With reference to FIG. 5, a cylinder unit 131 is shown. The cylinder unit 131 is substantially similar to the cylinder unit 101 shown in FIG. 2 and the same reference numerals have been used for clarity and the components that are identical have not been described in detail for conciseness. The cylinder unit 131 has at least a part of a first cylinder channel 132 defined therein. The channel 132 extends from a bottom portion 134 of the second chamber 110 to a first valve 136 via a first conduit 138. A first conduit extension 140 extends between the valve 136 and a fluid medium supply unit 142 that contains a first fluid medium 143. The unit 142 is in fluid communication with a third valve 144 via a connection conduit 146. The third valve 144 is also closeable to prevent any fluid flow therethrough and openable to permit a fluid flow through the valve 144. One end of a third conduit extension 148 is in fluid communication with the valve 144 and the opposite end is in fluid communication with a third cylinder channel 150 that, in turn, is in fluid communication with the first chamber 109 so that the entire channel 150 extends between the chamber 109 and the valve 144.

The second cylinder channel 120 is in fluid communication with a second valve 152 via a conduit extension 154 so that the entire channel 120 extends between the sensor channel 119 and the valve 152. A connection conduit 156 extends between the valve 152 and a fluid medium supply unit 158 that contains a second fluid medium 160, such as oil or any other suitable medium. The unit 158 may be an accumulator that can provide and receive the medium.

The tube 113 has one end 250 attached to the base part 114 so that the sensor channel 119 is aligned with the channel 120. The hollow piston rod 111 has an inner layer 258 extending axially along the entire recess 116 and chamber 117 and down to a bottom 260 that forms a piston area for the stop cylinder. The layer 258 may be made of a suitable material such as aluminum or brass that dampens the inductance. The tube 113 has an inner layer 252, an intermediate layer 254 and an outer layer 256. The inner layer 252 made be a magnetic steel material so that the inductance becomes sufficiently high. The intermediate layer 254 may be an electrically conductive material such as a copper spool or winding. The layer 256 should be a non-magnetic steel material.

In general, a control system is connected to the tube 113 and the valves 136, 144, 152 for controlling the flow of the medium depending upon the inductance values sensed by the tube 113. The piston 108 has a non-magnetic sealing unit 262 attached to an underside of the piston 108. When the piston 108 is moved up and down along the tube 113, the shielding layer 258 covers different lengths of the tube 113. A relatively short length is covered when the piston is in an upper position and a relatively long length is covered when the piston 108 is in a lower position. FIG. 5 shows the piston 108 in a lower position. The shorter the length that is covered by the layer 258, i.e. when the piston 108 is in the upper position, the higher the inductance from the intermediate winding layer 254 of the tube 113 because a longer portion of the winding layer 254 below the piston 108 is not shielded by the layer 258. The winding layer 254 carries an AC current that generates the inductance. By measuring the inductance generated, it is possible to determine the position of the piston 108 in the cylinder 131. It is also possible to measure the velocity of the movement of the piston and the temperature inside the cylinder. The resistance of the copper winding in the winding layer 254 varies with the temperature. By taking advantage of the resistance changes in the copper winding, the temperature in the copper winding and the sensor may be measured. The resistance changes may also be used to indicate the temperature in the entire cylinder or shock absorber. This information may be used to compensate for impedance changes of the copper winding and viscosity changes of the fluid that are a result of the temperature changes.

In operation, the piston 108 may be moved downwardly by opening the valves 136, 144 so that the fluid medium 143, such as air, fills the chamber 109 and the medium 143 may escape the chamber 110 through the opened valve 136 and into the unit 142. The piston 108 may be moved upwardly by opening the valves 136, 144 so that the fluid medium 143 fills the chamber 110 and the medium 143 may escape from the chamber 109 through the open valve 144. It is also important that the valve 152 is open so that the fluid 160 may flow into and out of the chambers 116, 117 and the piston 108 is moved upwardly and downwardly.

For example, the valve 136 may first be opened to permit air to flow in under the piston 108, the valve 144 is not activated when it is already open to permit air to escape from the cylinder. The valve 152 is opened so that the fluid medium 160, such as oil, may flow out of the chambers 116, 117 and the piston 108 moves upwardly.

As indicated above, it is important that the valve 152 is opened otherwise the piston is locked in position. When the desired position is achieved, as indicated by the signals sent by the sensor, the valve 152 is closed and the movement of the piston 108 stops. The valve 136 is then closed to permit air to escape from the chamber 110. The piston 108 is now held in place by the fluid or oil trapped in the chambers 116, 117. The valves 136, 144 may be of a type that is allows air to go into the cylinder and out of the cylinder into the atmosphere. When the valve is closed no air is led into the cylinder but air is allowed to escape into the atmosphere.

Of course, the medium 160 may flow into and out of the cylinder the same time as the medium 143 flows into and out of the cylinder unit 131. Because the bottom 260 is sealed and fully enclosed, the medium 160 cannot escape from the chambers 116, 117 unless the valve 152 is opened. When the valve 152 is again closed the position of the piston 108 is locked in place. It should be noted that the size of the chambers 116, 117 varies depending upon the position of the piston 108 since the piston is sealed with the seals 262 against the inner wall of the cylinder and against the tube 113. This movement affects the size of the chambers 116, 117. If the fluid medium 160 has a higher viscosity than the medium 143, it is difficult or impossible to move the piston 108 by injecting more of the compressible medium 143, such as air, into the chambers 109, 110. As mentioned above, it may even be possible to remove the pressure of the medium 143 from the chambers 109, 110 without affecting the locked position of the piston 108. In this way, an air-pressure system may be securely locked, by closing the oil flow through the valve 152, without any undesirable springing effect on the piston 108. Since oil is not compressible, the drawbacks of the compressible air cylinders are avoided.

The cylinder unit 162, shown in FIG. 6, is substantially similar to the cylinder unit 131. However, the cylinder unit 162 has a top part 164 via an axial channel 166 defined therein and extending therethrough. All other components are identical that of the cylinder unit 131 and are therefore not described again. The axial channel 166 may be in fluid communication with an external function 167 such as a movable hydraulic bucket mounted on a vehicle. The fluid 160 may be any suitable medium such as high-pressure air that may be used to clean blow parts. In this way, the flow in the sensor channel 119 may also be used to control the external function 167 in addition to the functions of the channels 19, 119 and tubes 13, 113 described above. For example, the user may want the cylinder unit to carry out a movement or task when the piston is at a desired predetermined position so that a valve in the channel 166 is opened to be able to clean or cool off a work piece by using the cylinder unit. The sensor senses the position of the piston and when the piston position is correct, the valve in the cylinder channel 166 may be opened so that air passes through the cylinder and the channel 166 to blow air on the work piece.

One important feature of the cylinder units 131, 162 is that the valves may be used to lock the movement of the piston 108 and that the medium flow in the sensor channel is independent and separate from the flow in the channels leading into and out of the first and second chambers 109, 110. For example, the valves 136, 144 may be opened and closed, as desired, to guide the flow of the flow medium 143 in the channels 134, 150. The flow media 143, 160 may be any suitable media such as a gas or liquid and since the medium 143 is not mixed with the medium 160, the medium 143 may be different from the medium 160. The flow of the medium 160 in the sensor channel 119 may be used to achieve a locking function or another secondary function. For example, the position of a bucket may be locked into a predetermined position by injecting the flow medium 160 into the closed enclosures 116, 117. The double functional cylinder unit 131 may also be used as a shock absorber. It is possible to add a valve to the channel 166 so that the embodiment in FIG. 4 is very similar to the embodiment shown in FIG. 3 when the valve is closed. As best shown in FIGS. 3, 4, the cylinders may be connected to a control system that controls the opening and closing of the various valves in view of the position of the piston, as desired.

While the present invention has been described in accordance with preferred compositions and embodiments, it is to be understood that certain substitutions and alterations may be made thereto without departing from the spirit and scope of the following claims.

I claim:

1. An arrangement for a piston and cylinder device, comprising:
    a cylinder unit having an inner space defined therein, the inner space having a flowable medium disposed therein;
    a slidable piston unit disposed in the inner space, the piston unit being movable in a forward and backward direction, the piston unit dividing the inner space into a first chamber and a second chamber;
    a piston rod connected to the piston unit and having a recess defined therein;
    the cylinder unit having an end wall at the second chamber, the end wall having at least a part of a first and second cylinder channel defined therein, the cylinder unit having a third cylinder channel defined therein;
    a hollow sensor element disposed in the inner space and attached to the end wall, the sensor element having an axial sensor channel defined therein and extending therethrough, the piston unit being slidably associated with the sensor element and the sensor element extending through the piston unit and into the recess of the piston rod;
    the first cylinder channel in fluid communication with the second chamber, the sensor channel having a bottom end opening in fluid communication with one end of the second cylinder channel, the third cylinder channel in fluid communication with the first chamber; and
    a conductive member disposed in the sensor element, the conductive member being connected to an electric unit for detecting an inductance.

2. The arrangement according to claim 1 wherein the recess is an enclosed chamber that is only in fluid communication with the sensor channel.

3. The arrangement according to claim 1 wherein a first control valve in operative engagement with the first cylinder channel for controlling the flow of fluid through the first cylinder channel.

4. The arrangement according to claim 3 wherein the arrangement has a second control valve in operative engagement with the second cylinder channel for controlling the flow of fluid through the second cylinder channel.

5. The arrangement according to claim 3 wherein the arrangement has a third control valve in operative engagement with the third cylinder channel for controlling the flow of fluid through the third cylinder channel.

6. The arrangement according to claim 1 wherein the piston rod has an upper end, the upper end having an axial opening defined therein that is in fluid communication with the recess of the piston rod and the sensor channel.

7. The arrangement according to claim 5 wherein the third valve and the first valve are in communication with a first medium supply container so that a first medium in the first medium supply container is in fluid communication with the first chamber and the second chamber.

8. The arrangement according to claim 4, wherein the sensor element comprises an electrical detection element that is a tube-shaped element collaborating with the piston unit.

9. The arrangement according to claim 8, wherein the sensor element is connected to position sensitive detection devices that consist of an electrical system.

10. The arrangement according to claim 9 wherein the sensor element comprises an inductive functioning sensor device formed by an electrical conductor that has been wound into a coil that lies in the longitudinal direction of the tube-shaped element.

11. The arrangement according to claim 10 wherein the second valve is in operative engagement with the sensor element and that a degree of opening of the second valve is controlled and regulated on the basis of signals and data that are received from the sensor element.

12. The arrangement according to claim 11 wherein the first valve and third valve are in operative engagement with the sensor element and that a degree of opening of the valves is controlled and regulated on the basis of signals and data that are received from the sensor element.

13. The arrangement according to claim 1 wherein the first cylinder channel carries a first fluid medium, the recess and the sensor channel carry a second fluid medium and the first fluid medium is separate from the second fluid medium.

* * * * *